United States Patent
Fujinoki et al.

(10) Patent No.: US 11,133,526 B2
(45) Date of Patent: *Sep. 28, 2021

(54) SOLID ELECTROLYTE HAVING MAGNESIUM ION CONDUCTIVITY AND MAGNESIUM SECONDARY BATTERY USING THE SAME

(71) Applicant: Panasonic Intellectual Property Management Co., Ltd., Osaka (JP)

(72) Inventors: Norihito Fujinoki, Osaka (JP); Takuji Tsujita, Osaka (JP); Yu Nishitani, Osaka (JP); Morio Tomiyama, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 585 days.

This patent is subject to a terminal disclaimer.

(21) Appl. No.: 15/658,313

(22) Filed: Jul. 24, 2017

(65) Prior Publication Data

US 2018/0159170 A1 Jun. 7, 2018

(30) Foreign Application Priority Data

Dec. 7, 2016 (JP) .............................. JP2016-237242
Dec. 28, 2016 (JP) .............................. JP2016-254958

(51) Int. Cl.
*H01M 10/056* (2010.01)
*H01M 10/054* (2010.01)
(Continued)

(52) U.S. Cl.
CPC ........... *H01M 10/056* (2013.01); *H01M 4/13* (2013.01); *H01M 4/366* (2013.01); *H01M 4/62* (2013.01);
(Continued)

(58) Field of Classification Search
CPC .......... H01M 4/13; H01M 4/366; H01M 4/62; H01M 10/54; H01M 10/056;
(Continued)

(56) References Cited

U.S. PATENT DOCUMENTS 3,808,042 A * 4/1974 Dietz ...................... H01L 23/15
427/96.1
10,511,053 B2 12/2019 Fujinoki et al.
(Continued)

FOREIGN PATENT DOCUMENTS

JP 2001-076533 A 3/2001
JP 2004-200015 A 7/2004
(Continued)

OTHER PUBLICATIONS

Chen; "Comparing electrochemical performance of transition metal silicate cathodes and chevrel phase Mo6S8 in the analogous rechargeable Mg-ion battery system"; (Year: 2016).*
(Continued)

*Primary Examiner* — Nathanael T Zemui
(74) *Attorney, Agent, or Firm* — McDermott Will and Emery LLP

(57) ABSTRACT

A solid electrolyte has a composition represented by the formula: $Mg_xM_ySiO_z$, where M represents at least one selected from the group consisting of Ti, Zr, Hf, Ca, Sr, and Ba; x satisfies $0<x<2$; y satisfies $0<y<2$; and z satisfies $3<z<6$.

13 Claims, 6 Drawing Sheets

(51) Int. Cl.
*H01M 4/13* (2010.01)
*H01M 4/62* (2006.01)
*H01M 4/36* (2006.01)

(52) U.S. Cl.
CPC .. *H01M 10/054* (2013.01); *H01M 2300/0071* (2013.01); *H01M 2300/0094* (2013.01)

(58) Field of Classification Search
CPC ..... H01M 10/0562; H01M 2300/0071; H01M 2300/0094
See application file for complete search history.

(56) References Cited

U.S. PATENT DOCUMENTS

| | | |
|---|---|---|
| 2002/0036131 A1 | 3/2002 | Kugai et al. |
| 2002/0068677 A1* | 6/2002 | Crosbie ............... C03C 3/078 501/32 |
| 2004/0131933 A1 | 7/2004 | Itaya et al. |
| 2006/0073390 A1 | 4/2006 | Omote et al. |
| 2009/0197181 A1* | 8/2009 | Sakitani ............... H01M 4/131 429/305 |
| 2011/0014518 A1 | 1/2011 | Nakai et al. |
| 2011/0165400 A1* | 7/2011 | Quaghebeur ....... C04B 40/0231 428/220 |
| 2011/0171536 A1 | 7/2011 | Oki et al. |
| 2014/0234700 A1* | 8/2014 | Moriwaka ........... H01M 4/5825 429/199 |
| 2015/0017536 A1* | 1/2015 | Abe ...................... H01M 4/505 429/220 |
| 2015/0364789 A1 | 12/2015 | Ogawa et al. |
| 2016/0254541 A1 | 9/2016 | Kim et al. |
| 2016/0308248 A1 | 10/2016 | Burrell et al. |
| 2017/0018804 A1 | 1/2017 | Ogasa et al. |
| 2017/0229742 A1* | 8/2017 | Aykol ............... H01M 10/0525 |
| 2018/0006327 A1 | 1/2018 | Shibata et al. |
| 2018/0159177 A1 | 6/2018 | Tsujita et al. |
| 2018/0190981 A1* | 7/2018 | Ban ...................... H01M 4/134 |
| 2019/0135644 A1 | 5/2019 | Ito et al. |

FOREIGN PATENT DOCUMENTS

| | | |
|---|---|---|
| JP | 2006-134871 A | 5/2006 |
| JP | 2007-157416 A | 6/2007 |
| JP | 2011-023241 A | 2/2011 |
| JP | 2012-099436 A | 5/2012 |
| JP | 2017-022024 A | 1/2017 |
| WO | 2014/017461 A1 | 1/2014 |
| WO | 2014/119663 | 8/2014 |
| WO | 2014/175255 A1 | 10/2014 |
| WO | 2016/042594 | 3/2016 |
| WO | WO-2016042594 A1 * | 3/2016 ............... H01B 1/06 |

OTHER PUBLICATIONS

Chen Ling et al., "First-principles study of the magnesiation of divines: redox reaction mechanism, electrochemical and thermodynamic properties", J. Mater. Chem., May 16, 2012, 22, pp. 13517-13523.

Notice of Allowance issued in U.S. Appl. No. 15/658,320, dated Oct. 3, 2019.

Non-Final Office Action issued in U.S. Appl. No. 15/808,835, dated Apr. 16, 2020.

Non-Final Office Action issued in U.S. Appl. No. 15/808,835, dated Nov. 9, 2020.

Non-Final Office Action issued in U.S. Appl. No. 15/808,835, dated May 18, 2021.

STIC Search (Year: 2020), File Registry issued in U.S. Appl. No. 15/808,835, dated Sep. 10, 2020.

* cited by examiner

SOLID ELECTROLYTE HAVING MAGNESIUM ION CONDUCTIVITY AND MAGNESIUM SECONDARY BATTERY USING THE SAME

BACKGROUND

1. Technical Field

The present disclosure relates to a solid electrolyte and a secondary battery including the solid electrolyte.

2. Description of the Related Art

In recent years, magnesium secondary batteries have been expected to be practically applied. Magnesium secondary batteries have high theoretical capacity densities compared to known lithium ion batteries.

International Publication No. WO 2016/042594 discloses a solid electrolyte composed of an oxide containing magnesium, silicon, and aluminum in an olivine structure.

SUMMARY

In one general aspect, the techniques disclosed here feature a solid electrolyte having a composition represented by the formula: $Mg_xM_ySiO_z$, where M represents at least one selected from the group consisting of Ti, Zr, Hf, Ca, Sr, and Ba; x satisfies $0<x<2$; y satisfies $0<y<2$; and z satisfies $3<z<6$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
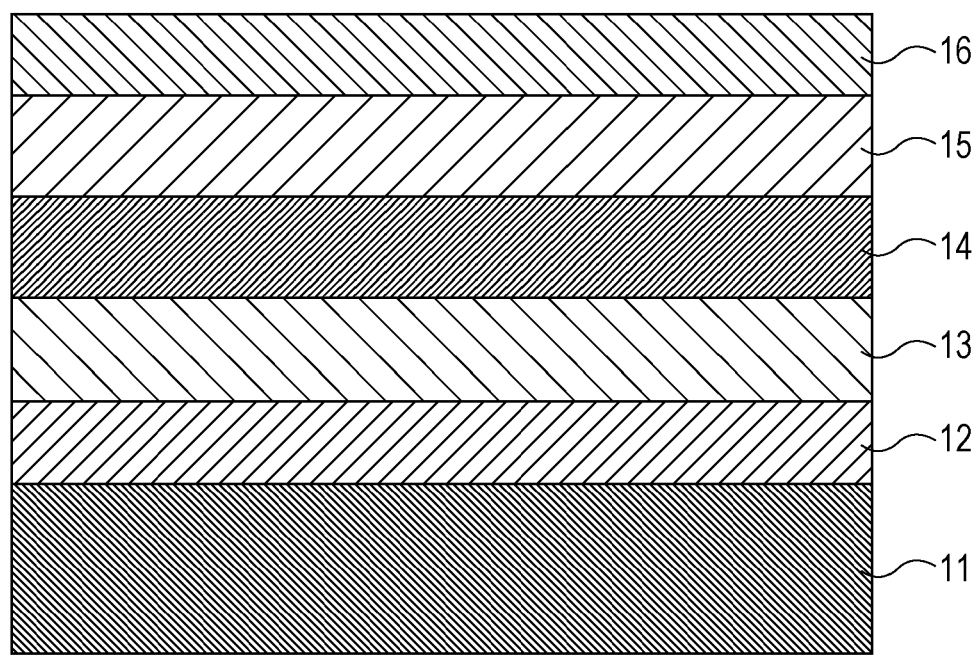
FIG. 1A is a cross-sectional view schematically illustrating a structural example of a secondary battery of an embodiment.

The Embodiment will now be described in more details using the drawings.

All the descriptions below show comprehensive or specific examples. The numbers, compositions; shapes, film thicknesses, electrical characteristics; structures of secondary batteries, electrode materials, etc. shown below are merely examples and are not intended to limit the present disclosure. The components that are not mentioned in any independent claim describing the broadest concept will be described as optional components.

Solid electrolytes for secondary batteries will now be mainly described, but the use of the solid electrolytes of the present disclosure is not limited thereto. For example, the solid electrolytes may be used for electrochemical devices, such as ion concentration sensors.

Embodiments

1. Solid Electrolyte

1-1. Composition of Solid Electrolyte

The electrostatic interaction of a divalent magnesium ion with an anion in a solid electrolyte is high compared to that of a monovalent lithium ion. Therefore, magnesium ions are less likely to diffuse in a solid electrolyte. Accordingly, solid electrolytes having magnesium ion conductivity are desired to be improved in ionic conductivity.

In such situations, the present inventor has found the following novel solid electrolyte.

The solid electrolyte according to the Embodiment has a composition represented by the formula: $Mg_xM_ySiO_z$, where M represents at least one selected from the group consisting of Ti, Zr, Hf, Ca, Sr, and Ba; x satisfies $0<x<2$; y satisfies $0<y<2$; and z satisfies $3<z<6$.

The composition ratio of each element constituting the solid electrolyte can be quantitatively measured by, for example, X-ray photoelectron spectroscopy (XPS).

The "solid electrolyte" in this disclosure is not limited to those that strictly satisfy the above-mentioned formula and may contain a trace amount of impurities other than the constitutional elements shown in the formula.

The solid electrolyte according to the Embodiment can show high conductivity of magnesium ions. This is probably caused by the following reasons.

The solid electrolyte according to the Embodiment is constituted of a plurality of layers of coordination polyhedra, magnesium ions disposed between these layers, and metal ions (that is, ions of metal M in the above-mentioned formula) substituting for a part of the magnesium ions, in at least the region of short-distance order. The coordination polyhedra are each an octahedron composed of six-coordinated oxygen ions surrounding a silicon atom. In the solid electrolyte according to the Embodiment, since a part of magnesium ions is substituted with metal ions, high conductivity of magnesium ions can be realized. The details thereof will be described below.

In the formula mentioned above, the composition ratio x of magnesium satisfies $0<x<2$. Consequently, the solid electrolyte can have a deficit of magnesium atoms. This deficit allows magnesium ions to readily move and thereby can increase the conductivity of magnesium ions in the solid electrolyte.

In the formula mentioned above, the composition ratio y of metal M satisfies $0<y<2$.

In the formula mentioned above, the sum x+y of the composition ratio of magnesium and the composition ratio of metal M satisfies $1<x+y<2.5$.

From the viewpoint of contribution to the improvement of ionic conductivity of the introduction of metal M, the composition ratio $y/(x+y)$ of the metal M to the sum of magnesium and the metal M is desirably 0.01 or more, more desirably higher than 0.3, and most desirably higher than 0.5.

In the formula mentioned above, the composition ratio z of oxygen satisfies $3<z<6$. For example, if the ratio z satisfies $3<z<4$, the solid electrolyte can have a deficit of oxygen. In such a case, the amount of oxygen ions having a Coulomb attraction to magnesium ions can be decreased, leading to easy movement of the magnesium ions. For example, if the ratio z satisfies $4<z<6$, the solid electrolyte can have a deficit of magnesium and/or can have MgO. The deficit of magnesium allows the magnesium ions to readily move. MgO deforms the coordination polyhedron to allow the magnesium ions to readily move, and the generation of MgO decreases the amount of oxygen ions to weaken the Coulomb attraction to magnesium ions. Accordingly, the conductivity of magnesium ions in the solid electrolyte can be improved by adjusting the ratio z.

The solid electrolyte may be an amorphous material. The "amorphous material" in the present disclosure is not limited to materials that have no crystal structure at all and may be a material that includes a crystalline region within the range of short-distance order. The term "amorphous material", for example, refers to a material that does not show a sharp peak derived from a crystal but shows a broad peak derived from a noncrystalline material in X-ray diffraction (XRD). The solid electrolyte of an amorphous material enables the distances between the atoms and/or ions to be broadened. Consequently, the space around a magnesium ion is broadened to weaken the Coulomb attraction to the magnesium ion from the anions around the magnesium ion. As a result, the solid electrolyte of an amorphous material can have excellent ionic conduction characteristics.

The solid electrolyte of an amorphous material can be formed as a thin film. The thickness of the solid electrolyte may be, for example, 100 nm or more and 20 μm or less or further 2 μm or less. In such a case, the resistance value against the conduction of magnesium ions can be reduced while suppressing the occurrence of pinholes in the solid electrolyte. For example, in a solid electrolyte having an ionic conductivity of $2\times10^{-7}$ S/cm and a thickness of 100 nm, the resistance value per unit area of the solid electrolyte can be reduced to 50 $\Omega\cdot cm^2$ or less.

1-2. Solid Electrolyte Containing Ti, Zr, and/or Hf

In the formula $Mg_xM_ySiO_z$, when the metal M is Ti, Zr, and/or Hf, parts of the divalent magnesium ions are substituted with tetravalent metal ions. In such a case, vacancy defects are formed in parts of the magnesium ion site due to the electroneutrality conditions, and the magnesium ions can migrate through the vacancy defects. In addition, the tetravalent metal ions strongly attract anions by the Coulomb attraction, resulting in weakening of the Coulomb attraction to the magnesium ions from the anions around the magnesium ions to allow the magnesium ions to readily move. Accordingly, Ti, Zr, and/or Hf can reduce the activation energy of magnesium ions in the solid electrolyte to enhance the ionic conductivity of the magnesium ions.

The ionic radii (i.e., crystal radii) of a titanium ion, a zirconium ion, and a hafnium ion are 0.75 angstrom, 0.86 angstrom, and 0.85 angstrom, respectively, whereas the ionic radius (i.e., crystal radius) of a magnesium ion is 0.86 angstrom. Accordingly, the ionic radii of a titanium ion, a zirconium ion, and a hafnium ion are all close to the ionic radius of a magnesium ion. Specifically, the difference between the magnesium ion radius and each of the titanium, zirconium, and hafnium ion radii is within ±15% of the magnesium ion radius. Accordingly, the substitution with Ti, Zr, and/or Hf can improve the ionic conductivity of magnesium ions, while maintaining the structural stability of the solid electrolyte. That is, both the stability against a change in temperature and high ionic conductivity can be simultaneously achieved.

Furthermore, each of the ionic radii of a zirconium ion and a hafnium ion is almost the same as that of a magnesium ion. Specifically, the difference between the magnesium ion radius and each of the zirconium and hafnium ion radii is within ±5% of the magnesium ion radius. Accordingly, the substitution with Zr and/or Hf can improve the ionic conductivity of magnesium ions, while more effectively maintaining the structural stability of the solid electrolyte.

1-3. Solid Electrolyte Containing Ca, Sr, and/or Ba

In the formula $Mg_xM_ySiO_z$, when the metal M is Ca, Sr, and/or Ba, parts of the divalent magnesium ions are substituted with divalent metal ions. The ionic radii (i.e., crystal radii) of a calcium ion, a strontium ion, and a barium ion are 1.14 angstrom, 1.32 angstrom, and 1.49 angstrom, respectively, whereas the ionic radius (i.e., crystal radius) of a magnesium ion is 0.86 angstrom. Accordingly, the ionic radii of a calcium ion, a strontium ion, and a barium ion are all larger than the ionic radius of a magnesium ion. The substitution with Ca, Sr, and/or Ba enhances the lattice size of a coordination polyhedron and/or the distance between coordination polyhedra. Consequently, the space where magnesium ions move can be enlarged. In addition, magnesium ions can be spaced from one another to weaken the Coulomb repulsive force between magnesium ions, resulting in enhanced mobility of the magnesium ions. Accordingly, Ca, Sr, and/or Ba can enhance the ionic conductivity of magnesium ions in the solid electrolyte.

2. Method of Producing Solid Electrolyte

The solid electrolyte of the Embodiment can be formed by, for example, a physical deposition method or a chemical deposition method. Examples of the physical deposition method include sputtering, vacuum evaporation, ion plating, and pulsed-laser deposition (PLD). Examples of the chemical deposition method include atomic layer deposition (ALD), chemical vapor deposition (CVD), liquid phase deposition, a sol-gel method, metallo-organic decomposition (MOD), spray pyrolysis deposition (SPD), a doctor blade method, spin coating, and printing techniques. Examples of CVD include plasma CVD, thermal CVD, and laser CVD. The liquid phase deposition is, for example, wet plating, and examples of the wet plating include electric plating, immersion plating, and electroless plating. Examples of the printing techniques include an ink jet method and screen printing. The solid electrolyte is desirably a film that can be formed by sputtering, vacuum evaporation, PLD, CVD, or ALD. However, the method of forming a solid electrolyte is not limited to these methods.

The solid electrolyte of the Embodiment can be formed, for example, without annealing. Therefore, the production process can be simplified, the production cost can be reduced, and the yield can be increased.

3. Secondary Battery

3-1. Structure

An example of the secondary battery according to an Embodiment will be described using FIG. 1A. FIG. 1A is a cross-sectional view schematically illustrating a structural example of a secondary battery 10 of the Embodiment.

The secondary battery 10 includes a substrate 11, a positive electrode collector 12, a positive electrode 13, a solid electrolyte 14, a negative electrode 15, and a negative electrode collector 16. The solid electrolyte 14 is disposed between the positive electrode 13 and the negative electrode 15, and an intermediate layer may be disposed therebetween. Magnesium ions can move between the positive electrode 13 and the negative electrode 15 through the solid electrolyte 14.

The substrate 11 may be an insulating substrate or may be a conductive substrate. The substrate 11 may be any substrate that does not change when an inorganic material layer or an organic material layer is formed thereon, Examples of the substrate 11 include glass substrate, plastic substrates, polymer films, silicon substrates, metal plates, metal foil sheets, and laminates thereof. The substrate 11 may be a commercially available one or may be produced by a known method.

The positive electrode collector 12 is constituted of an electronic conductor that does not cause a chemical change with the ionic conductor contained in the positive electrode 13, within the operating voltage of the secondary battery 10. The operating voltage of the positive electrode collector 12 against the standard redox potential of magnesium may be, for example, within a range of +2.5 to +4.5 V. The positive electrode collector 12 is made of, for example, a metal or an alloy, More specifically, the positive electrode collector 12 may be made of a metal or alloy containing at least one metal element selected from the group consisting of copper, chromium, nickel, titanium, platinum, gold, aluminum, tungsten, iron, and molybdenum. The positive electrode collector 12 may be made of, for example, aluminum, an aluminum alloy, platinum, or gold, from the viewpoint of electric conductivity, resistance to ionic conductor, and redox potential.

The positive electrode collector 12 may be formed of a transparent conductive film, Examples of the transparent conductive film include films of indium tin oxide (ITO), indium zinc oxide (IZO), fluorine-doped tin oxide (FTO), antimony-doped tin oxide (ATO), indium oxide ($In_2O_3$), tin oxide ($SnO_2$), and Al-containing ZnO.

The positive electrode collector 12 may be a laminated film composed of the above-mentioned metals and/or transparent conductive films.

The positive electrode 13 contains a positive electrode active material that can occlude and release magnesium ions. Examples of the positive electrode active material include metal oxides, polyanion salts, sulfides, chalcogenide compounds, and hydrides. Examples of the metal oxide include transition metal oxides, such as $V_2O_5$, $MnO_2$, and $MoO_3$; and magnesium complex oxides, such as $MgCoO_2$ and $MgNiO_2$. Examples of the polyanion salt include $MgCoSiO_4$, $MgMnSiO_4$, $MgFeSiO_4$, $MgNiSiO_4$, $MgCo_2O_4$, and $MgMn_2O_4$. Examples of the sulfide include $Mo_6S_8$. Examples of the chalcogenide compound include $Mo_9Se_{11}$.

The positive electrode active material is, for example, crystalline. The positive electrode 13 may contain two or more positive electrode active materials.

The positive electrode 13 may contain, for example, a conductive material or a binder, as needed.

The conductive material may be any electron-conductive material. Examples of the conductive material include carbon materials, metals, and electroconductive polymers. Examples of the carbon material include graphites, such as natural graphites (e.g., lump graphite and flaky graphite) and artificial graphites; acetylene black; carbon black; Ketchen black; carbon whisker; needle coke; and carbon fibers. Examples of the metal include copper, nickel, aluminum, silver, and gold. These materials may be used alone or in combination of two or more thereof. The conductive material may be, for example, carbon black or acetylene black, from the viewpoint of electron conductivity and coating properties.

The binder may be any material that plays a role of binding active material particles and conductive material particles. Examples of the binder include fluorine-containing resins, such as polytetrafluoroethylene (PTFE), polyvinylidene fluoride (PVdF), and fluororubber; thermoplastic resins, such as polypropylene and polyethylene; ethylene propylene diene monomer (EPDM) rubber; sulfonated EPDM rubber; and natural butyl rubber (NBR). These materials may be used alone or in combination of two or more thereof. The binder may be, for example, a water dispersion of cellulose or styrene-butadiene rubber (SBR).

Examples of the solvents for dispersing the positive electrode active material, the conductive material, and the binder include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The solvent may be, for example, a dispersant containing a thickener. Examples of the thickener include carboxymethyl cellulose and methyl cellulose.

The positive electrode 13 is formed, for example, as follows. First, a positive electrode active material, a conductive material, and a binder are mixed. Subsequently, an appropriate solvent is added to this mixture to prepare a positive electrode material in a paste form, Subsequently, this positive electrode material is applied to the surface of a positive electrode collector, followed by drying. As a result, a positive electrode 13 is prepared. The positive electrode material may be compressed for increasing the electrode density.

The positive electrode 13 may be in a thin film form. The thickness of such a positive electrode 13 may be, for example, 500 nm or more and 20 μm or less.

Since the solid electrolyte 14 is the above-described solid electrolyte, the descriptions thereof are omitted.

The negative electrode 15 may contain a negative electrode active material that can cause magnesium metal or magnesium alloy to be dissolved and deposited on the negative electrode collector 16. Alternatively, the negative electrode 15 may contain a negative electrode active material that can occlude and release magnesium ions. Examples of the negative electrode active material include metals, alloys, sulfides, carbon, organic compounds, inorganic compounds, metal complexes, and organic polymer compounds. Examples of the metal include magnesium, tin, bismuth, and antimony. Examples of the alloy include alloys of magnesium with at least one selected from aluminum, silicon, gallium, zinc, tin, manganese, bismuth, and antimony.

The negative electrode 15 may contain two or more negative electrode active materials.

The negative electrode 15 may contain, for example, a conductive material or a binder, as needed. In the negative electrode 15, the conductive material, the binder, the solvent, and the thickener described in the positive electrode 13 can be appropriately used.

The negative electrode 15 may be in a thin film form. The thickness of such a negative electrode 15 may be, for example, 500 nm or more and 20 μm or less.

The negative electrode collector 16 is constituted of an electronic conductor that does not cause a chemical change with the ionic conductor contained in the negative electrode 15, within the operating voltage of the secondary battery 10. The operating voltage of the negative electrode collector 16 against the standard reduction potential of magnesium may be, for example, within a range of 0 to +1.5 V. In the negative electrode collector 16, the materials described in the positive electrode collector 12 can be appropriately used.

Each of the positive electrode collector 12, the positive electrode 13, the solid electrolyte 14, the negative electrode 15, and the negative electrode collector 16 can be formed by the chemical deposition method or the physical deposition method described above.

The shape of the secondary battery 10 in a top view may be, for example, a rectangle, a circle, an ellipse, or a hexagon. The structure of the secondary battery 10 may be cylindrical, square, button-like, coin-like, or flat.

3-2. First Modification Example

Figure 1B:
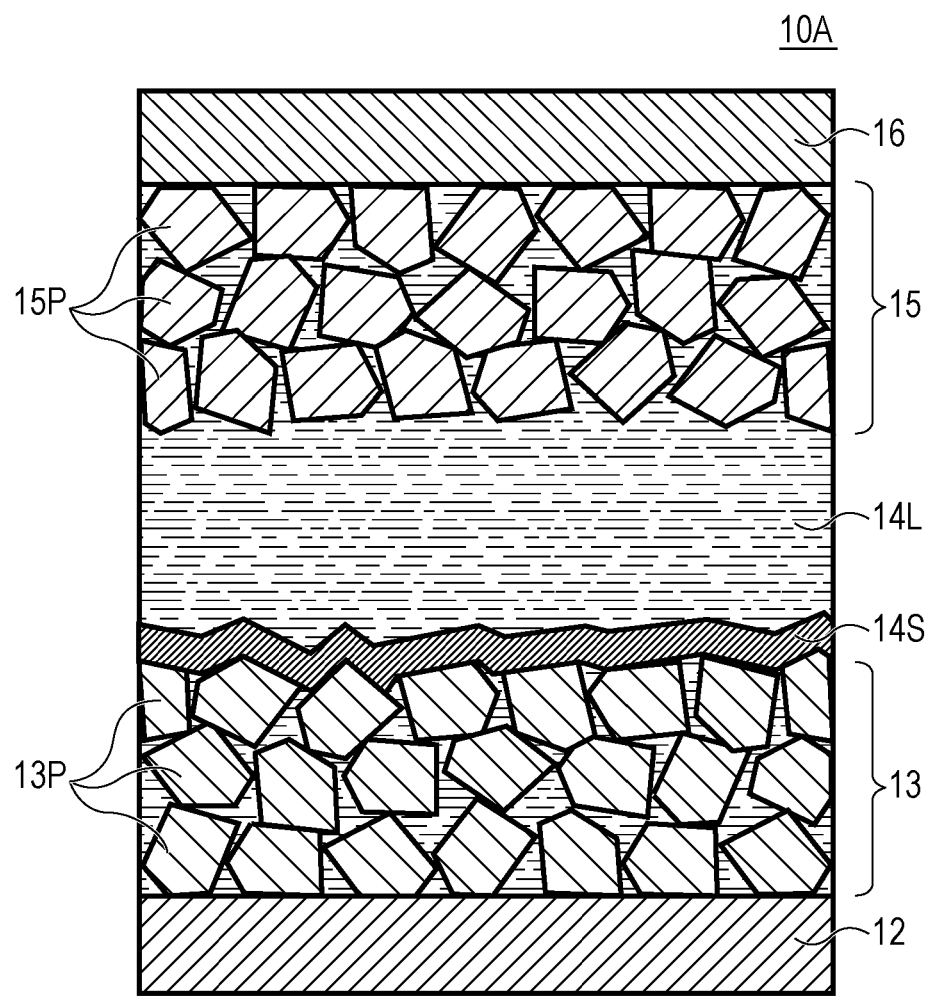
FIG. 1B is a cross-sectional view schematically illustrating a first modification example of the secondary battery of the embodiment.

FIG. 1B is a cross-sectional view schematically illustrating the structure of a secondary battery 10A according to a first modification example of the Embodiment.

The secondary battery 10A includes a positive electrode collector 12, a positive electrode active material layer 13, a negative electrode active material layer 15, a negative electrode collector 16, a electrolytic solution 14L, and a solid electrolyte layer 14S. The secondary battery 10A may further include, for example, a separator (not shown), separating the solid electrolyte layer 143 and the negative electrode active material layer 15. In such a case, the electrolytic solution 14L may be impregnated inside the separator.

The positive electrode active material layer 13 is disposed on the positive electrode collector 12 and contains a plurality of positive electrode active material particles 13P. In other words, a plurality of positive electrode active material particles 13P are disposed on the positive electrode collector 12. The upper surface of the positive electrode active material layer 13 is an irregular surface defined by the positive electrode active material particles 13P. The positive electrode active material layer 12 may contain a conductive material and/or a binder as needed, in addition to the positive electrode active material.

The negative electrode active material layer 15 is disposed on the negative electrode collector 16 and contains a plurality of negative electrode active material particles 15P. In other words, a plurality of negative electrode active material particles 15P are disposed on the negative electrode collector 16. The lower surface of the negative electrode active material layer 15 is an irregular surface defined by the negative electrode active material particles 15P.

The solid electrolyte layer 14S is a single layer disposed on the positive electrode active material layer 13. The solid electrolyte layer 14S collectively covers the positive electrode active material particles 13P. The solid electrolyte layer 14S is formed along the irregular surface defined by the positive electrode active material particles 13P.

The solid electrolyte layer 14S has the same composition as that of the solid electrolyte 14. The solid electrolyte layer 14S is an amorphous material and can therefore be formed as a thin film. This thin film may have a thickness of, for example, 1 nm or more and 200 nm or less. In addition, since the solid electrolyte layer 14S is an amorphous material, the thin film can be easily formed along the irregular surface of the positive electrode active material layer 12.

The electrolytic solution 14L fills the space between the positive electrode active material layer 13 and the negative electrode active material layer 15. The electrolytic solution 14L may further fill the gaps among the positive electrode active material particles 13P and may fill the gaps among the negative electrode active material particles 15P.

The electrolytic solution 14L is a liquid prepared by dissolving a magnesium salt in a nonaqueous solvent and can move magnesium ions depending on the electric field.

Examples of the material of the nonaqueous solvent include cyclic ethers, chain ethers, cyclic carbonates, chain carbonates, cyclic carboxylates, chain carboxylates, pyrocarbonates, phosphates, borates, sulfates, sulfites, cyclic sulfones, chain sulfones, nitriles, and sultones. As the solvent, these materials may be used alone or in combination of two or more thereof.

Examples of the magnesium salt include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_6SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, and $Mg[PF_3(CF_2CF_3)_3]_2$. As the magnesium salt, these materials may be used alone or in combination of two or more thereof.

In a known secondary battery including an electrolytic solution and not including a solid electrolyte layer, giving and receiving of electrons are performed at the contact surfaces of the positive electrode active material and the electrolytic solution, leading to a risk of decomposing the electrolytic solution. In contrast, since the secondary battery 10A includes a solid electrolyte layer 14S covering a positive electrode active material layer 13, electrons are prevented from moving between the positive electrode active material layer 13 and the electrolytic solution 14L, while permitting magnesium ions to move between the positive electrode active material layer 13 and the electrolytic solution 14L. Accordingly, decomposition of the electrolytic solution 14L can be prevented while maintaining the electrical characteristics of the secondary battery 10A. As a result, the secondary battery 10A is stabilized and can have a long life-span.

The solid electrolyte layer 14S may not completely prevent the contact between the positive electrode active material layer 13 and the electrolytic solution 14L. Even in such case, the solid electrolyte layer 14S enables the contact area between the positive electrode active material layer 13 and the electrolytic solution 14L to be reduced compared to one having a structure not including the solid electrolyte layer 14S.

In particular, during the charging of the secondary battery 10A, if the charging potential of the positive electrode is higher than 4 V, the function of the solid electrolyte layer 14S more efficiently works to prevent the decomposition of the electrolytic solution 14L. For example, a designer can use an electrolytic solution material that has been thought not to be capable of being used in a charging potential range of higher than 4 V as the electrolytic solution 14L of the secondary battery 10A. For example, a designer can employ a nonaqueous solvent that has been used in a known lithium ion secondary battery as the nonaqueous solvent of a high-capacity magnesium secondary battery. Accordingly, the degree of freedom in selection of the material for the secondary battery 10A is increased.

In the secondary battery 10A, the electrolytic solution 14L and the solid electrolyte layer 14S can function as electrolytes. A designer can make the electrolytic solution 14L function as a main component of the electrolyte by, for example, adjusting the distance between the negative electrode active material layer 15 and the solid electrolyte layer 14S and the thickness of the solid electrolyte layer 14S. Consequently, it is possible to realize a secondary battery including an electrolyte having excellent electrical characteristics compared to, for example, a secondary battery of which all of the electrolyte is solid (i.e., all-solid secondary battery).

In the secondary battery 10A, the solid electrolyte layer 14S covers the positive electrode active material layer 13 so as to collectively cover a plurality of positive electrode active material particles 13P. Accordingly, the solid electrolyte layer 14S is easily produced compared to, for example, the solid electrolyte coat 14C described below. In addition, for example, if the positive electrode active material layer 13 contains a conductive material, the solid electrolyte layer 14S can also cover the conductive material, in addition to the positive electrode active material particles 13P. Accordingly, the solid electrolyte layer 14S can also suppress the reaction between the conductive material and the electrolytic solution 14L.

Furthermore, the solid electrolyte layer 14S can prevent occurrence of passive films by covering the positive electrode active material layer 13 and thus can thereby secure stable charge and discharge operation of the secondary battery 10A.

3-3. Second Modification Example

Figure 1C:
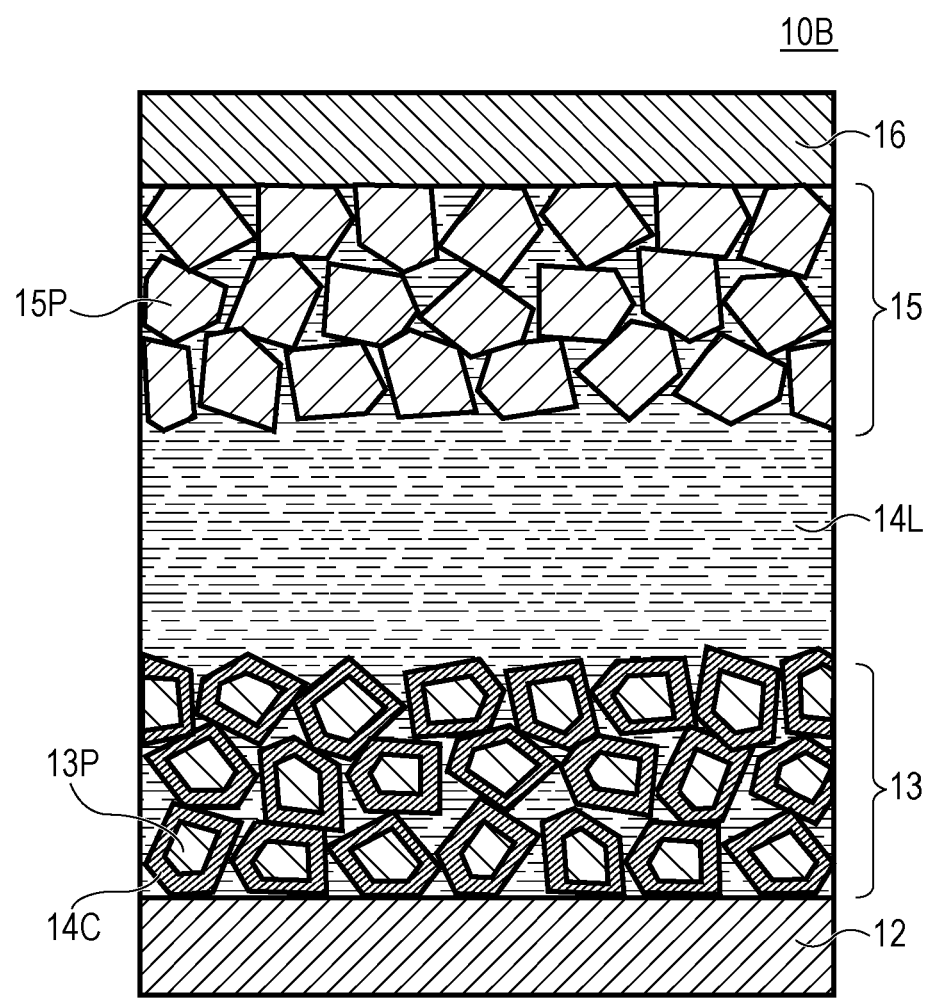
FIG. 1C is a cross-sectional view schematically illustrating a second modification example of the secondary battery of the embodiment.

FIG. 1C is a cross-sectional view schematically illustrating the structure of a secondary battery 10B according to a second modification example of the Embodiment.

The secondary battery 10B has the same structure as that of the secondary battery 10A except that a solid electrolyte coat 14C is included instead of the solid electrolyte layer 14S.

Each surface of the positive electrode active material particles 13P is covered with the solid electrolyte coat 14C. In other words, the positive electrode active material layer 13 is covered with a solid electrolyte constituted of a plurality of the solid electrolyte coats 14C.

The solid electrolyte coat 140 has the same composition as that of the solid electrolyte 14. The solid electrolyte coat 140 is an amorphous material and can therefore be easily formed along the shape of the positive electrode active material particles 13P to improve the coatability. The solid electrolyte coat 14C may have a thickness of, for example, 1 nm or more and 200 nm or less.

The positive electrode active material layer 13 is formed, for example, as follows. First, the surfaces of positive electrode active material particles 13P are coated with a solid electrolyte to form solid electrolyte coats 140. Subsequently, the solid electrolyte-coated positive electrode active material particles 13P are mixed with a conductive material and a binder. An appropriate solvent is then added to this mixture to prepare a positive electrode mixture in a paste form. This positive electrode mixture is then applied to the surface of a positive electrode collector 12, followed by drying.

The solid electrolyte coats 14C may be formed by, for example, depositing a solid electrolyte material by the physical deposition method or the chemical deposition method while moving the positive electrode active material particles 13P. Alternatively, the solid electrolyte coats 14C may be formed by, for example, a sol-gel method or the above-described liquid phase deposition.

The secondary battery 10B shows the same effects as the various effects described in the first modification example. Furthermore, in the secondary battery 10B, each of the plurality of the positive electrode active material particles 13P is covered with the solid electrolyte coat 14C. Accordingly, the surfaces of the positive electrode active material particles 13P are not or hardly exposed to the gaps among the positive electrode active material particles 13P. Accordingly, for example, even if these gaps are filled with the electrolytic solution 14L, the oxidative decomposition of the electrolytic solution 14L can be more effectively prevented and/or occurrence of passive films on the positive electrode can be effectively suppressed.

3-4. Other Modification Examples

The structure of the secondary battery according to the Embodiment is not limited to those described above. For example, the secondary battery may include a first solid electrolyte layer collectively covering the positive electrode active material particles and a second solid electrolyte layer collectively covering the negative electrode active material particles. In another example, the secondary battery may include the second solid electrolyte layer, without including the first solid electrolyte layer. In another example, the secondary battery may include first solid electrolyte coats individually covering each of the positive electrode active material particles and second solid electrolyte coats individually covering each of the negative electrode active material particles. In another example, the secondary battery may include the second solid electrolyte coats, without including the first solid electrolyte coats. In another example, at least one of the positive electrodes and the negative electrodes of the secondary battery may be a plate-like metal electrode.

4. Experiments 4-1. Example 1

[4-1-1. Production of Sample]

A plurality of solid electrolyte samples of Example 1 were produced.

A substrate was washed and was then set in a vacuum chamber. The inside of the vacuum chamber was then evacuated to about $2 \times 10^{-6}$ Pa. Subsequently, a solid electrolyte was formed on the substrate by high-frequency magnetron sputtering using a 4-inch diameter target of $Mg_2SiO_4$ and $ZrSiO_4$. Ar and $O_2$ were used as the sputtering gas at a flow rate of 19.6 sccm and 2.4 sccm, respectively, at a gas pressure of 0.65 Pa. The sputtering powers of $Mg_2SiO_4$ and $ZrSiO_4$ were 200 W (RF) and 100 W (RF), respectively. Consequently, a solid electrolyte having a thickness of 367 nm was formed. Silicon, glass, and quartz substrates were used as the substrates of a plurality of samples. These substrates each had a length of 18 mm, a width of 18 mm, and a thickness of 1 mm.

Only in the case of a quartz substrate, platinum electrodes were formed on the top and bottom of a solid electrolyte as follows. Before formation of a solid electrolyte, a platinum electrode was first formed on a substrate using platinum as a target, a stripe-like shadow mask having a width of 1 mm, and Ar as the sputtering gas. The thickness of the platinum electrode was 200 nm. Subsequently, a solid electrolyte was formed under the above-mentioned conditions. Lastly, a platinum electrode was formed on the solid electrolyte by the same procedure as that described above.

[4-1-2. Composition Analysis]

The composition of the solid electrolyte of Example 1 was evaluated by X-ray photoelectron spectroscopy (XPS). Herein, a solid electrolyte formed on a silicon substrate was used as the sample. The element concentration profile in the film depth direction was measured by alternately repeating XPS measurement of the solid electrolyte with an XPS apparatus (Quamtera SXM: manufactured by Ulvac-Phi, Inc.) and Ar sputtering against the solid electrolyte. The measurement results demonstrated that the solid electrolyte of Example 1 had a composition of $Mg_{1.54}Zr_{0.28}SiO_{4.40}$.

[4-1-3. Structure Analysis]

Figure 2:
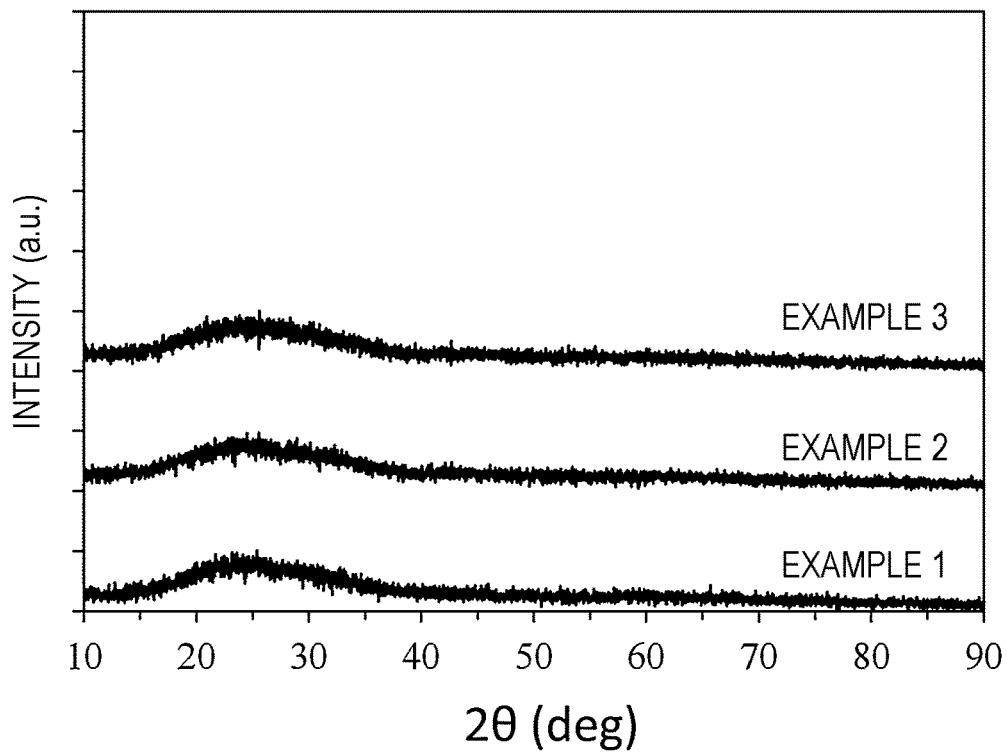
FIG. 2 shows XRD diffraction patterns of the solid electrolytes of Examples 1 to 3.

The crystallinity of the solid electrolyte of Example 1 was evaluated by X-ray diffraction (XRD). Herein, a solid electrolyte formed on a glass substrate was used as the sample. The structure of the sample was analyzed by a wide-angle X-ray diffraction $\theta$-$2\theta$ method with an XRD apparatus (SmartLab: manufactured by Rigaku Corporation). The XRD diffraction pattern of the solid electrolyte of Example 1 is shown in FIG. 2. As shown in FIG. 2, the solid electrolyte of Example 1 was an amorphous material. The broad peak appearing around a $\theta$ of 20° to 30° is derived from the glass substrate.

[4-1-4. Evaluation of Ionic Conductivity]

Figure 4:
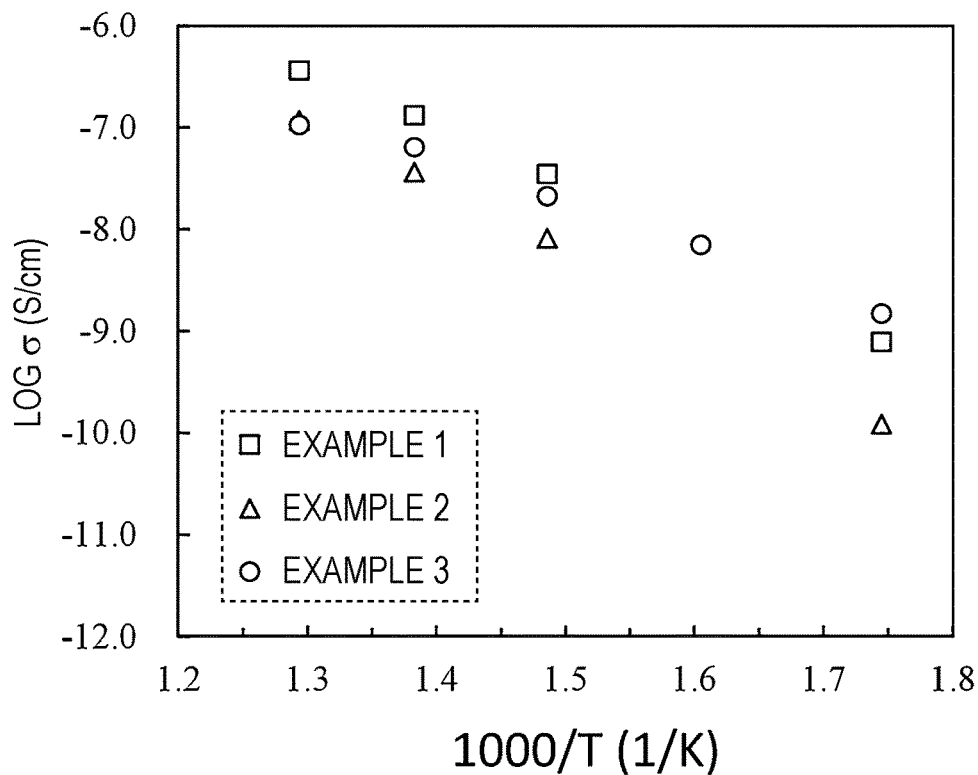
FIG. 4 is a graph showing a relationship between the temperature and the ionic conductivity of each of the solid electrolytes of Examples 1 to 3.

The ionic conductivity of the solid electrolyte of Example 1 was measured by an alternating current impedance method. Herein, a solid electrolyte formed on a quartz substrate was used as the sample. First, the sample was set on the heating stage in a chamber, and the inside of the chamber was purged with a nitrogen atmosphere. The alternating current impedance of the solid electrolyte of the sample was then measured, while changing the temperature of the sample. Specifically, the alternating current impedance of the solid electrolyte was measured with an electrochemical measuring system (Modulab: manufactured by Solartron Analytical) at a frequency range of 0.01 Hz to 1 MHz under an AC bias amplitude of 20 mV. Thus, the resistance value along the normal direction of the main surface of the solid electrolyte layer was measured, and the measured resistance value was converted into ionic conductivity. The relationship between the temperature and the ionic conductivity of the solid electrolyte of Example 1 is shown in FIG. 4. The ionic conductivity of the solid electrolyte of Example 1 was about $3.6\times10^{-7}$ S/cm at 500° C. Furthermore, based on the result, the activation energy for ionic conductivity was calculated. The activation energy of the solid electrolyte of Example 1 was about 1.25 eV.

4-2. Example 2

[4-2-1. Production of Sample]

A plurality of solid electrolyte samples of Example 2 were produced. The production process was the same as that in Example 1 except that the sputtering powers of $Mg_2SiO_4$ and $ZrSiO_4$ were 210 W (RF) and 200 W (RF), respectively. As a result, a solid electrolyte having a thickness of 616 nm was formed.

[4-2-2. Composition Analysis]

The composition of the solid electrolyte of Example 2 was measured by the same method as that in Example 1. The measurement result demonstrated that the solid electrolyte of Example 2 had a composition of $Mg_{1.21}Zr_{0.77}SiO_{4.86}$.

[4-2-3. Structure Analysis]

The crystallinity of the solid electrolyte of Example 2 was measured by the same method as that in Example 1. The XRD diffraction pattern of the solid electrolyte of Example 2 is shown in FIG. 2. As shown in FIG. 2, the solid electrolyte of Example 2 was an amorphous material.

[4-2-4. Evaluation of Ionic Conductivity]

The ionic conductivity of the solid electrolyte of Example 2 was measured by the same method as that in Example 1. The relationship between the temperature and the ionic conductivity of the solid electrolyte of Example 2 is shown in FIG. 4. The ionic conductivity of the solid electrolyte of Example 2 was about $1.2\times10^{-7}$ S/cm at 500° C. Furthermore, based on the result, the activation energy for ionic conductivity was calculated. The activation energy of the solid electrolyte of Example 2 was about 1.39 eV.

4-3. Example 3

[4-3-1. Production of Sample]

A plurality of solid electrolyte samples of Example 3 were produced. The production process was the same as that in Example 1 except that the sputtering powers of $Mg_2SiO_4$ and $ZrSiO_4$ were 110 W (RF) and 200 W (RF), respectively. As a result, a solid electrolyte having a thickness of 396 nm was formed.

[4-3-2. Composition Analysis]

The composition of the solid electrolyte of Example 3 was measured by the same method as that in Example 1. The measurement result demonstrated that the solid electrolyte of Example 3 had a composition of $Mg_{0.67}Zr_{1.25}SiO_{5.22}$.

[4-3-3. Structure Analysis]

The crystallinity of the solid electrolyte of Example 3 was measured by the same method as that in Example 1. The XRD diffraction pattern of the solid electrolyte of Example 3 is shown in FIG. 2. As shown in FIG. 2, the solid electrolyte of Example 3 was an amorphous material.

[4-3-4. Evaluation of Ionic Conductivity]

The ionic conductivity of the solid electrolyte of Example 3 was measured by the same method as that in Example 1. The relationship between the temperature and the ionic conductivity of the solid electrolyte of Example 3 is shown in FIG. 4. The ionic conductivity of the solid electrolyte of Example 3 was about $1.1\times10^{-7}$ S/cm at 500° C. Furthermore, based on the result, the activation energy for ionic conductivity was calculated. The activation energy of the solid electrolyte of Example 3 was about 0.89 eV.

4-4. Example 4

[4-4-1. Production of Sample]

A plurality of solid electrolyte samples of Example 4 were produced. The production process was the same as that in Example 1 except that (i) the targets were $Mg_2SiO_4$ and $Ca_2SiO_4$ and (ii) the sputtering powers of $Mg_2SiO_4$ and $Ca_2SiO_4$ were 200 W (RF) and 100 W (RF), respectively. As a result, a solid electrolyte having a thickness of 630 nm was formed.

[4-4-2. Composition Analysis]

The composition of the solid electrolyte of Example 4 was measured by the same method as that in Example 1. The measurement result demonstrated that the solid electrolyte of Example 4 had a composition of $Mg_{1.46}Ca_{0.79}SiO_{3.90}$.

[4-4-3. Structure Analysis]

Figure 3:
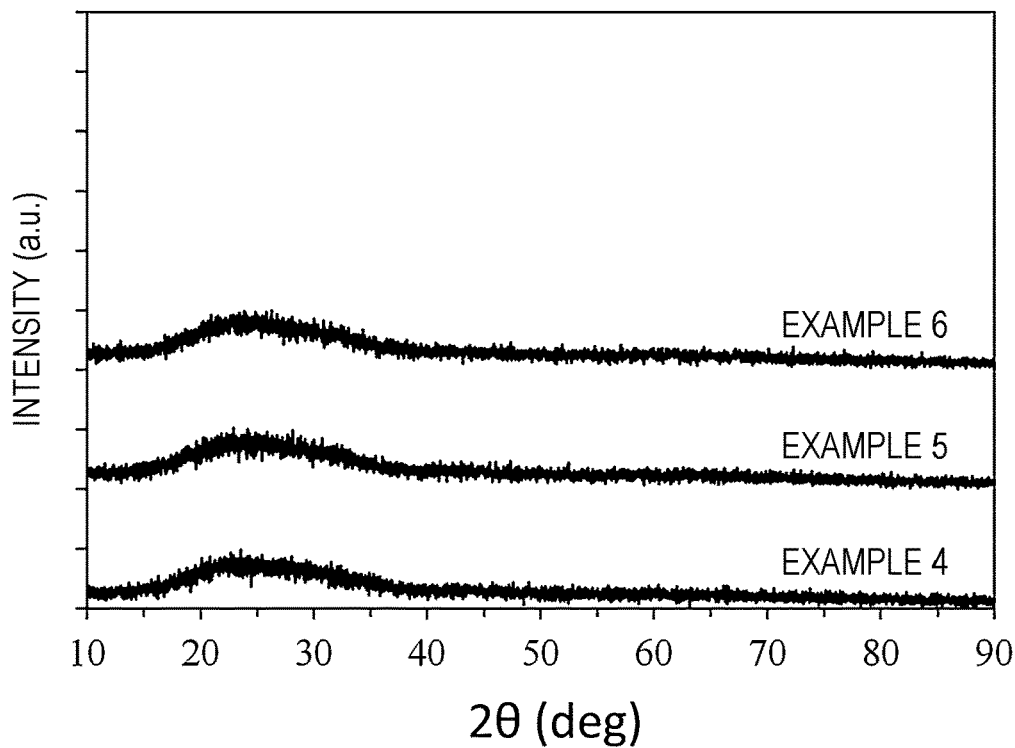
FIG. 3 shows XRD diffraction patterns of the solid electrolytes of Examples 4 to 6.

The crystallinity of the solid electrolyte of Example 4 was measured by the same method as that in Example 1. The XRD diffraction pattern of the solid electrolyte of Example 4 is shown in FIG. 3. As shown in FIG. 3, the solid electrolyte of Example 4 was an amorphous material.

[4-4-4. Evaluation of Ionic Conductivity]

Figure 5:
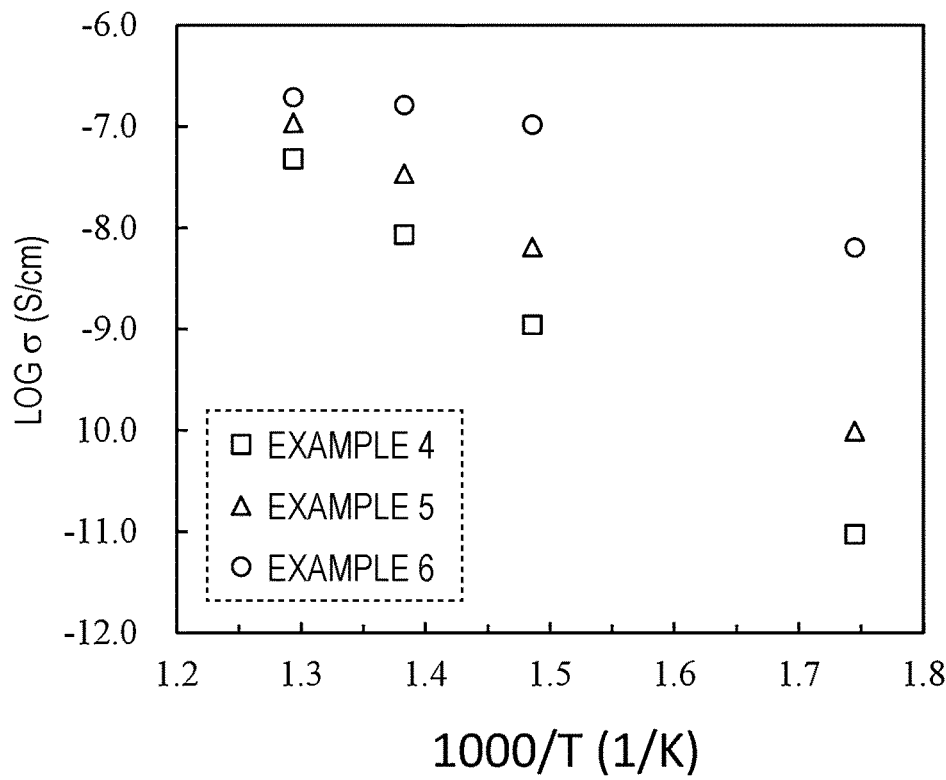
FIG. 5 is a graph showing a relationship between the temperature and the ionic conductivity of each of the solid electrolytes of Examples 4 to 6.

The ionic conductivity of the solid electrolyte of Example 4 was measured by the same method as that in Example 1, The relationship between the temperature and the ionic conductivity of the solid electrolyte of Example 4 is shown in FIG. 5. The ionic conductivity of the solid electrolyte of Example 4 was about $4.8 \times 10^{-8}$ S/cm at 500° C. Furthermore, based on the result, the activation energy for ionic conductivity was calculated. The activation energy of the solid electrolyte of Example 4 was about 1.69 eV.

4-5. Example 5

[4-5-1. Production of Sample]

A plurality of solid electrolyte samples of Example 5 were produced. The production process was the same as that in Example 4 except that the sputtering powers of $Mg_2SiO_4$ and $Ca_2SiO_4$ were 110 W (RF) and 100 W (RF), respectively. As a result, a solid electrolyte having a thickness of 375 nm was formed.

[4-5-2. Composition Analysis]

The composition of the solid electrolyte of Example 5 was measured by the same method as that in Example 1. The measurement result demonstrated that the solid electrolyte of Example 5 had a composition of $Mg_{1.10}Ca_{0.78}SiO_{3.67}$.

[4-5-3. Structure Analysis]

The crystallinity of the solid electrolyte of Example 5 was measured by the same method as that in Example 1. The XRD diffraction pattern of the solid electrolyte of Example 5 is shown in FIG. 3. As shown in FIG. 3, the solid electrolyte of Example 5 was an amorphous material.

[4-5-4. Evaluation of Ionic Conductivity]

The ionic conductivity of the solid electrolyte of Example 5 was measured by the same method as that in Example 1. The relationship between the temperature and the ionic conductivity of the solid electrolyte of Example 5 is shown in FIG. 5. The ionic conductivity of the solid electrolyte of Example 5 was about $1.1 \times 10^{-7}$ S/cm at 500° C. Furthermore, based on the result, the activation energy for ionic conductivity was calculated. The activation energy of the solid electrolyte of Example 5 was about 1.42 eV.

4-6. Example 6

[4-6-1. Production of Sample]

A plurality of solid electrolyte samples of Example 6 were produced. The production process was the same as that in Example 4 except that the sputtering powers of $Mg_2SiO_4$ and $Ca_2SiO_4$ were 56 W (RF) and 100 W (RF), respectively. As a result, a solid electrolyte having a thickness of 134 nm was formed.

[4-6-2. Composition Analysis]

The composition of the solid electrolyte of Example 6 was measured by the same method as that in Example 1. The measurement result demonstrated that the solid electrolyte of Example 6 had a composition of $Mg_{0.44}Ca_{0.86}SiO_{3.51}$.

[4-6-3. Structure Analysis]

The crystallinity of the solid electrolyte of Example 6 was measured by the same method as that in Example 1. The XRD diffraction pattern of the solid electrolyte of Example 6 is shown in FIG. 3. As shown in FIG. 3, the solid electrolyte of Example 6 was an amorphous material.

[4-6-4. Evaluation of Ionic Conductivity]

The ionic conductivity of the solid electrolyte of Example 6 was measured by the same method as that in Example 1. The relationship between the temperature and the ionic conductivity of the solid electrolyte of Example 6 is shown in FIG. 5. The ionic conductivity of the solid electrolyte of Example 6 was about $1.9 \times 10^{-7}$ S/cm at 500° C. Furthermore, based on the result, the activation energy for ionic conductivity was calculated. The activation energy of the solid electrolyte of Example 6 was about 0.74 eV.

4-7. Reference Example

[4-7-1. Production of Sample]

A plurality of solid electrolyte samples of Reference Example were produced. The production process was the same as that in Example 1 except that (i) the target was $Mg_2SiO_4$; (ii) Ar was used as the sputtering gas at a flow rate of 22 sccm; (iii) the gas pressure was 0.13 Pa; and (iv) the sputtering power was 100 W (RF). As a result, a solid electrolyte having a thickness of 520 nm was formed.

[4-7-2. Composition Analysis]

The composition of the solid electrolyte of Reference Example was measured by the same method as that in Example 1. The measurement result demonstrated that the solid electrolyte of Reference Example had a composition of $Mg_{1.42}SiO_{3.67}$.

[4-7-3. Structure Analysis]

The crystallinity of the solid electrolyte of Reference Example was measured by the same method as that in Example 1. The solid electrolyte of Reference Example was an amorphous material.

[4-7-4. Evaluation of Ionic Conductivity]

The ionic conductivity of the solid electrolyte of Reference Example was measured by the same method as that in Example 1. The ionic conductivity of the solid electrolyte of Reference Example was about $1.7 \times 10^{-9}$ S/cm at 500° C. Furthermore, based on the result, the activation energy for ionic conductivity was calculated. The activation energy of the solid electrolyte of Reference Example was about 1.93 eV.

4-8. Relationship Between Substitution Ratio and Activation Energy

Figure 6:
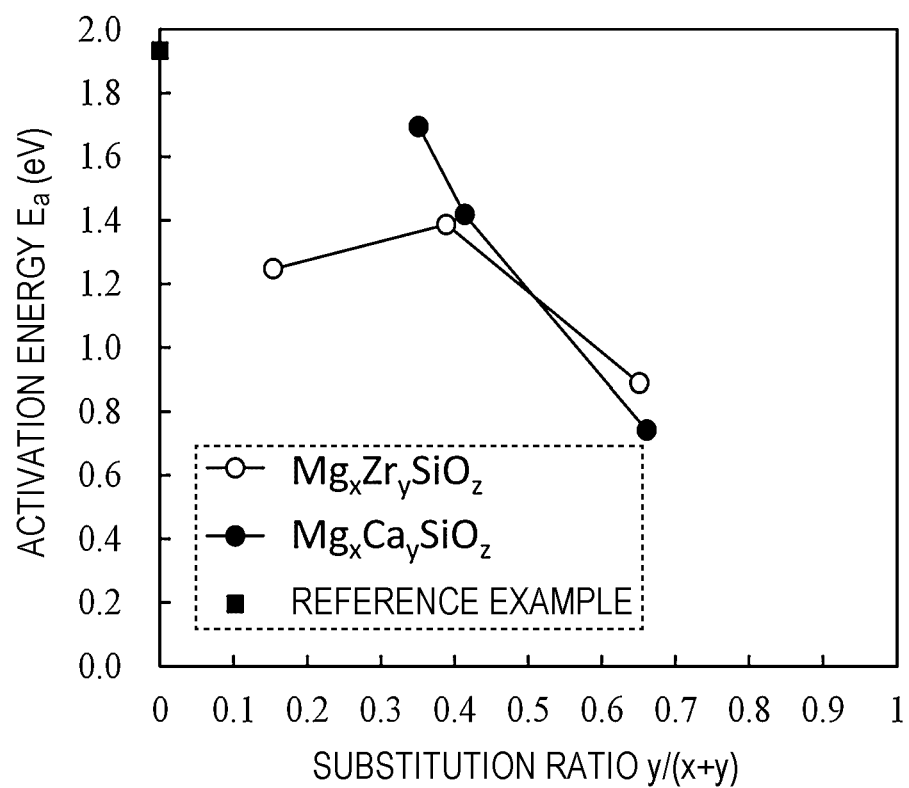
FIG. 6 is a graph showing a relationship between the substitution ratio y/(x+y) and the activation energy for ionic conductivity in the solid electrolytes of Examples 1 to 6 and Reference Example.

FIG. 6 shows a relationship between the substitution ratio $y/(x+y)$ and the activation energy for ionic conductivity in Examples 1 to 6 and Reference Example. As shown in FIG. 6, the activation energy for ionic conductivity in each of the solid electrolytes of Examples 1 to 6 was low compared to Reference Example. In particular, in the solid electrolytes of Examples 3 and 6, the substitution ratio was higher than 0.5, and the activation energy was significantly low.

5. Supplement

The present disclosure is not limited to the above-described Embodiments and Examples and can be variously modified or changed within the scopes of the claims. For example, the technical characteristics described in the Embodiment and/or Examples can be appropriately exchanged or combined.

What is claimed is:

1. A solid electrolyte having a composition represented by a formula:
   $Mg_xM_ySiO_z$, where M represents at least one selected from the group consisting of Zr, Hf, Ca, Sr, and Ba; x satisfies $0<x<2$; y satisfies $0<y<2$; x and y satisfy $0.5<y/(x+y)<1$; z satisfies $3<z<6$; being a film having a thickness of 100 nm or more and 20 pm or less.

2. A secondary battery comprising:
a positive electrode containing a positive electrode active material;
a negative electrode containing a negative electrode active material; and
a solid electrolyte having a composition represented by a formula:
$Mg_xM_ySiO_z$, where M represents at least one selected from the group consisting of Zr, Hf, Ca, Sr, and Ba; x satisfies $0<x<2$; y satisfies $0<y<2$; x and y satisfy $0.5<y/(x+y)<1$; z satisfies $3<z<6$.

3. The secondary battery according to claim 2, wherein M represents at least one selected from the group consisting of Ca, Sr, and Ba.

4. The secondary battery according to claim 2, wherein M represents Ca.

5. The secondary battery according to claim 2, being an amorphous material.

6. The secondary battery according to claim 2, wherein the positive electrode, the solid electrolyte, and the negative electrode are stacked.

7. The secondary battery according to claim 2, further comprising:
an electrolytic solution filling the space between the positive electrode and the negative electrode and containing a nonaqueous solvent and a magnesium salt dissolved in the nonaqueous solvent, wherein the solid electrolyte covers the positive electrode.

8. The secondary battery according to claim 7, wherein the positive electrode includes a positive electrode active material layer containing a plurality of positive electrode active material particles; and
the solid electrolyte is disposed as a single layer collectively covering the plurality of the positive electrode active material particles.

9. The secondary battery according to claim 7, wherein
the Positive electrode includes a positive electrode active material layer containing a plurality of positive electrode active material particles; and
the solid electrolyte is composed of a plurality of coats individually covering the plurality of the positive electrode active material particles.

10. A secondary battery comprising:
a positive electrode containing a positive electrode active material;
a negative electrode containing a negative electrode active material;
a solid electrolyte having a composition represented by a formula: $Mg_xZr_ySiO_z$, where; x satisfies $0<x<2$; y satisfies $0<y<2$; and z satisfies $3<z<6$; and
an electrolytic solution filling the space between the positive electrode and the negative electrode and containing a nonaqueous solvent and a magnesium salt dissolved in the nonaqueous solvent,
wherein the solid electrolyte covers the positive electrode.

11. The secondary battery according to claim 10, being an amorphous material.

12. The secondary battery according to claim 10, being a film having a thickness of 100 nm or more and 20 pm or less.

13. The secondary battery according to claim 10, wherein the positive electrode includes a positive electrode active material layer containing a plurality of positive electrode active material particles; and the solid electrolyte is composed of a plurality of coats individually covering the plurality of the positive electrode active material particles.

* * * * *